(12) United States Patent  
Flanagan et al.

(10) Patent No.: US 8,874,133 B2  
(45) Date of Patent: Oct. 28, 2014

(54) SYSTEM AND METHODS OF MOBILE GEOLOCATION

(75) Inventors: Michael Joseph Flanagan, Chester, NJ (US); Mohsen Zadeh-Koochak, Woolton Hill (GB); Li-Peng Wang, Stoke Poges (GB)

(73) Assignee: JDSU UK Limited, Basingstoke, Hampshire (GB)

( * ) Notice: Subject to any disclaimer, the term of this patent is extended or adjusted under 35 U.S.C. 154(b) by 165 days.

(21) Appl. No.: 13/311,132

(22) Filed: Dec. 5, 2011

(65) Prior Publication Data

US 2013/0143588 A1    Jun. 6, 2013

(51) Int. Cl.  
*H04W 24/00* (2009.01)

(52) U.S. Cl.  
USPC .................................... 455/456.1; 455/456.3

(58) Field of Classification Search  
USPC .......................... 455/456.1, 456.2, 456.3, 552  
See application file for complete search history.

(56) References Cited

U.S. PATENT DOCUMENTS

| | | | |
|---|---|---|---|
| 5,670,964 A | 9/1997 | Dent | |
| 6,246,861 B1 | 6/2001 | Messier et al. | |
| 6,889,053 B1 * | 5/2005 | Chang et al. | 455/456.3 |
| 7,826,862 B2 * | 11/2010 | Malik et al. | 455/522 |
| 2004/0022214 A1 | 2/2004 | Goren et al. | |
| 2005/0208952 A1 | 9/2005 | Dietrich et al. | |
| 2005/0267677 A1 * | 12/2005 | Poykko et al. | 701/207 |

FOREIGN PATENT DOCUMENTS

| | | |
|---|---|---|
| WO | 02/082832 A2 | 10/2002 |
| WO | 2010083943 A1 | 7/2010 |

OTHER PUBLICATIONS

Bo-Chieh Liu, Cellular Geolocation Employing Hybrid of Relative Signal Strength Propagation Delay, Wireless Communications and Networking Conference, 2006, WCNC 2006. IEEE, Las Vegas, NV, Apr. 3-6, 2006, pp. 2246-2251, vol. 4.

Ding-Bing Lin and Ron-Terng Juang, Mobile Location Estimation Based on Differences of Signal Attenuations for GSM Systems, VT-2003-00405R2, Revised Jun. 16, 2004.

European Search Report of counterpart EP Application No. 12195423.4-1811 issued by the European Patent Office dated Mar. 13, 2013.

* cited by examiner

*Primary Examiner* — Myron K Wyche  
(74) *Attorney, Agent, or Firm* — George Y. Wang

(57) ABSTRACT

A method and system for a cellular mobile communication system (900) are provided. The location of a mobile communication unit (905) in the cellular wireless communications system (900) can be estimated from: a first estimate of position, based on received signal power difference for signals received by the mobile communication unit (905) from at least two base stations (910); and a second estimate of the position of the mobile communication unit (905), from further information. A likelihood function for each estimate is weighted. The weighted first and second likelihood functions are combined, and one or more locations are selected as the estimated location. Propagation model parameters may be iteratively updated and/or refined, using location estimates obtained for large numbers of calls in the cellular mobile communication system (900).

22 Claims, 10 Drawing Sheets

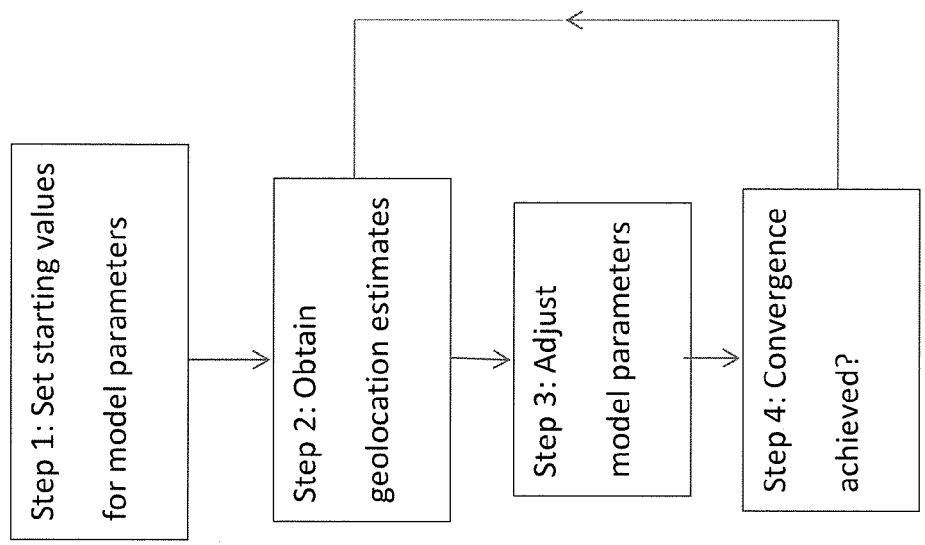

SYSTEM AND METHODS OF MOBILE GEOLOCATION

FIELD OF THE INVENTION

The field of the invention relates to a system and method for geolocating mobile communication units, in a mobile communications system.

BACKGROUND OF THE INVENTION

Wireless communication systems, such as GSM and the $3^{rd}$ Generation (3G) of mobile telephone standards and technology, are well known. An example of 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. 'Calls' may be data, video, or voice calls, or a combination of these. Such macro cells utilise high power base stations to communicate with wireless communication units within a relatively large geographical coverage area. The coverage area may be several square kilometers, or larger if it is not in a built-up area.

Typically, mobile communication units communicate with each other and other telephone systems through a network. In a 3G system, this is the 'Core Network' of the 3G wireless communication system, and the communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell with multiple antennas, each of which serves one sector of the cell. Often a wireless communication system is described as comprising two parts: the network, and the mobile communication units.

FIG. 1 provides a perspective view of one prior art wireless communication system 100. The system of FIG. 1 comprises a network of base stations BS1-BS8. Only one mobile communication unit 105 is shown. In a real network, there may be anywhere from thousands to millions of mobile communication units.

A base station such as BS1 110 communicates with mobile communication unit 105. Base station BS1 100 allows mobile communication unit 105 to place calls through the network, and receive calls routed through the network to base station BS1 100.

Base station BS7 112 has been shown as having a coverage area 114. If base station BS7 had an omnidirectional antenna, and the terrain were flat, then coverage area 114 might be circular. However, the coverage areas of typical base stations depend on many variables, and may change with time.

Controller 190 manages calls within the wireless communication system 100. Controller 190 would be linked to all the base stations BS1-BS8, but the links are not shown in order to keep FIG. 1 simple. Controller 190 may process and store call information from the base stations BS1-BS8, plus many other base stations not shown in FIG. 1. In a UMTS network, controller 190 may be linked to the base stations BS1-BS8 via one or more Radio Network Subsystems.

Other known wireless communication systems include:

'Mobile Location Estimation Based on Differences of Signal Attenuation for GSM Systems', Lin and Juang, IEEE Trans, on Vehicular Technology, July 2005. This paper is available at:
http://www.cce.ntut.edu.tw/ezfiles/0/academic/43/academic 46991 5867233 59222.pdf This publication uses measurements of the differences between signal strengths, received by a mobile communications unit. The signals considered are from omni-directional antenna. Parameters of the network are derived from a model called the "Cost-Hata" model.

'Cellular Geolocation Employing Hybrid of Relative Signal Strength and Propagation Delay', Liu and Lin, WCNC 2006 Proceedings.

This publication uses measurements of the differences between signal strengths, received by a mobile communications unit, and a measure of "Propagation Delay" for signals. The propagation model parameters are from the "Okumura-Hata" model. This publication uses a method of location estimation that assumes omni-directional antennae.

Patent application WO2010/083943A shows a further technique, which uses signal strength and timing data derived from the wireless communication unit itself, along with network configuration data provided by the network operator, to locate the wireless communication unit.

In conventional wireless communication systems, there is wide variation in the power levels of signals received from base stations. The variations depend on many issues, including location of the wireless communication unit and time. Conventional wireless communication systems also employ "Timing Advance". This is a deliberate offset, introduced into communication signals. Timing advance is used to allow better synchronisation of received signals by various different mobile communication units, located at different distances from a base station. Hence timing advance generally varies as a function of distance from the transmitter. In a typical implementation, timing advance may be controlled for users who are further away from the transmitter. This feature should be available in LTE, but the reporting of it may not be activated. However, a measure of timing advance is available from measurements made by the mobile communication unit, in some cellular wireless communication systems.

Known cellular wireless communication systems have the disadvantages that:
a) Generally, the exact calculation of received power as a function of distance is not possible. This is a result of factors whose magnitude is unknown a priori, such as:
  (i) The rate at which the power level attenuates with distance, and the attenuation of power at a reference distance.
  (ii) The additional attenuation of signals due to a mobile communication unit being located in a vehicle, such as a car or train, or in a building.
b) Timing Advance is not a direct measure of distance. Its use is primarily for synchronisation of communication channels. As such its value depends not only on distance, but also on various effects such as multi-path fading, hardware timing delays and such like. Hardware timing delays may be in the base station, or in a repeater in the cable from the antenna. If so, they are usually inaccessible, and hence may only be known to the infrastructure operator. However, some equipment allows the delays to be programmable, and hence both controllable and known. Furthermore timing advance is a coarse measure, each unit of timing advance corresponding to a distance of ~553 meters in GSM. Timing advance is however more precise in LTE, due to the higher symbol rate. It may be less than 100 meters in LTE.

BRIEF DESCRIPTION OF THE DRAWINGS

Embodiments of the invention will be described, by way of example only, with reference to the accompanying drawings, in which:

FIG. 10 is a simplified flowchart of a method in accordance with the invention.

DETAILED DESCRIPTION OF EMBODIMENTS OF THE INVENTION

Figure 1:
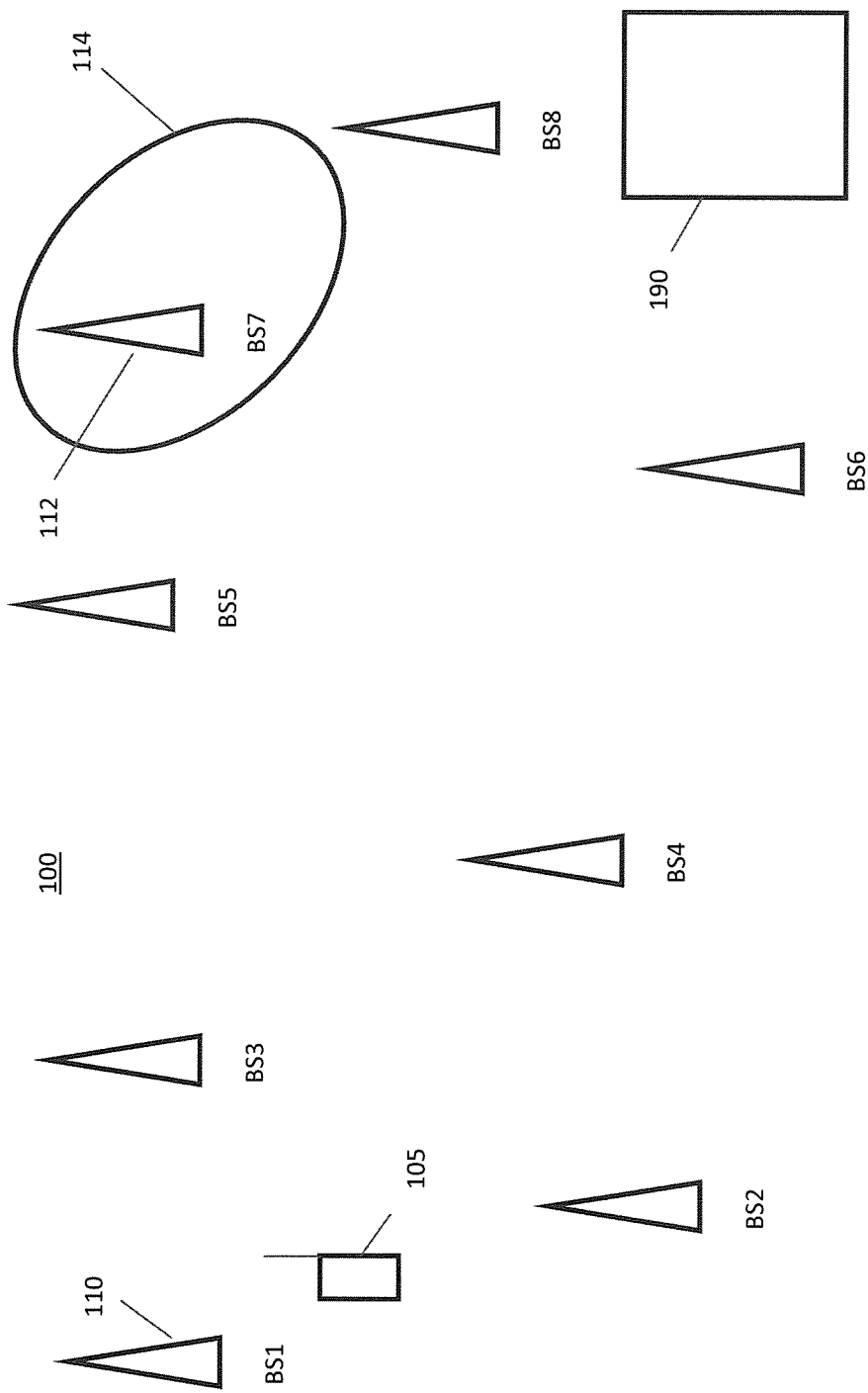
FIG. 1 is a schematic diagram, illustrating a prior art cellular wireless communication system.

A cellular wireless communications system is provided. The cellular wireless communication system may, for example, operate in accordance with the GSM, UMTS or LTE standards. The cellular wireless communications system comprises network nodes and mobile communication units. Each network node supports communications with mobile communication units in cell.

A network element of the cellular wireless communications system is operable to derive propagation model parameters. The derivation of the propagation model parameters uses signals received by mobile communication units from network nodes of the cellular wireless communication system. The network node may be a base station or an antenna covering a sector of a cell. The derivation of the propagation model parameters may use received signal strength measurements from many mobile communication units, the signals being received from at least two base stations of the cellular wireless communications system.

The cellular wireless communications system is operable to estimate the location of a mobile communication unit within a geographical area of the cellular wireless communications system, such as a cell or sector, based on:

(i) at least one received signal power difference, measured by the mobile communication unit, for signals received within the geographical area from at least two network nodes; and (ii) at least one contour, indicating locations within the geographical area having constant received signal strength difference for signals received from the at least two network nodes. The at least one contour is derived from the propagation model parameters.

In addition to the cellular wireless communications system of the invention, the invention also comprises a method of geolocating a mobile communication unit in a cellular wireless communications system.

The method comprises deriving propagation model parameters, using signals received by mobile communication units from network nodes of the cellular wireless communication system. The method further comprises estimating a location of a mobile communication unit within a geographical area of the cellular wireless communications system, based on:

(i) at least one received signal power difference measured by the mobile communication unit, for signals received within the geographical area from at least two network nodes;

(ii) at least one contour indicating locations within the geographical area having constant received signal strength difference for signals received from the at least two network nodes, the at least one contour being derived from the propagation model parameters.

The invention provides a method for estimating the location of a mobile communication unit, such as a smartphone or other wireless communication unit, which is communicating with a cellular wireless communications network. The method may be applicable to GSM, UMTS and LTE systems. It is also applicable to other cellular technologies whenever the relevant data, in particular received power levels, are available. Power levels fluctuate more than other parameters in most mobile communication systems. The perception that power levels are a less reliable measure has contributed to a reluctance by designers of known wireless communication systems to use power levels as a basis for deriving other measurements, such as location estimates.

In addition to providing a system and method for geolocation on the basis of received power levels, the invention may also comprise methods/systems for the following:

a) Estimating the magnitude of those factors that determine the attenuation of power levels, as a function of distance.

b) Combining the estimated magnitudes with other techniques, to:

(i) Estimate of the path-loss experienced by subscribers in the mobile network;

(ii) Estimate the timing advance correction factor. For a particular transmitter at a given base station of the network, the parameter estimated may be the mean offset. This offset could serve as a correction factor. In many cases, the correction factor would in turn allow better use of reported delays, for signal transmissions from the base station to a mobile communication unit.

In the following, the term 'propagation model parameters' incorporates at least:

(i) the rate at which the power level attenuates with distance; and (ii) the attenuation of power at a reference distance.

In accordance with a second aspect of the invention, a method of estimating a location of a mobile communication unit in a cellular wireless communications system may comprise:

(i) deriving a first estimate of the position of a mobile communication unit, from at least one received signal power difference for signals received by the mobile communication unit from at least two network nodes (910, 920);

(ii) deriving a first likelihood function for the first estimate, the first likelihood function indicating the probability that the mobile communication unit is at each spatial location in the cellular wireless communications system;

(iii) deriving at least one second estimate of the position of the mobile communication unit, from further information;

(iv) deriving a likelihood function for each of the at least one second estimate, the second likelihood function(s) indicating the probability that the mobile communication unit is at each spatial location in the cellular wireless communications system;

(v) weighting the first likelihood function, based on the reliability of the first estimate;

(vi) weighting each second likelihood function, based on the reliability of each of the at least one second estimate;

(vii) combining the weighted first and second likelihood functions;

(viii) selecting one or more locations as the estimated location.

The further information used to derive the at least one second position estimate may comprise one of the following:

(i) a measure of timing advance, for signals received by the mobile communication unit;

(ii) antenna pointing angle;
(iii) antenna radiation patterns.

A third aspect of the invention concerns a method for estimating the magnitude of a set of factors that determine the attenuation of power levels as a function of distance. The estimation is based on calls made by subscriber communication units, in the cellular wireless communications system. The method comprises:
(i) setting starting values for the parameters to be estimated, for at least one sector of the cellular wireless communications system;
(ii) obtaining location estimates, based on received power differences, for signals received by mobile communication units (905) from at least two base stations;
(iii) adjusting the model parameters according to the estimated locations obtained in step (ii);
(iv) repeating the second and then third steps with the adjusted parameters, until the model parameters converge.

In general, therefore various aspects of the invention may involve the following, which are explained in detail in connection with FIGS. 2-10:

A method of constructing contours of constant power differential where the judicial selection of contours and combinations of contours with other available data, to resolve ambiguities of multiple intersections within a cellular mobile communications network. An iterative method of estimating propagation model parameters where FIGS. 2-7 show various schematic views of a cellular wireless communications system. FIGS. 2-7 also show various contours, which may be used in geolocation. The description of FIGS. 2-7 also explains the derivation of one or more contours.

Figure 2:
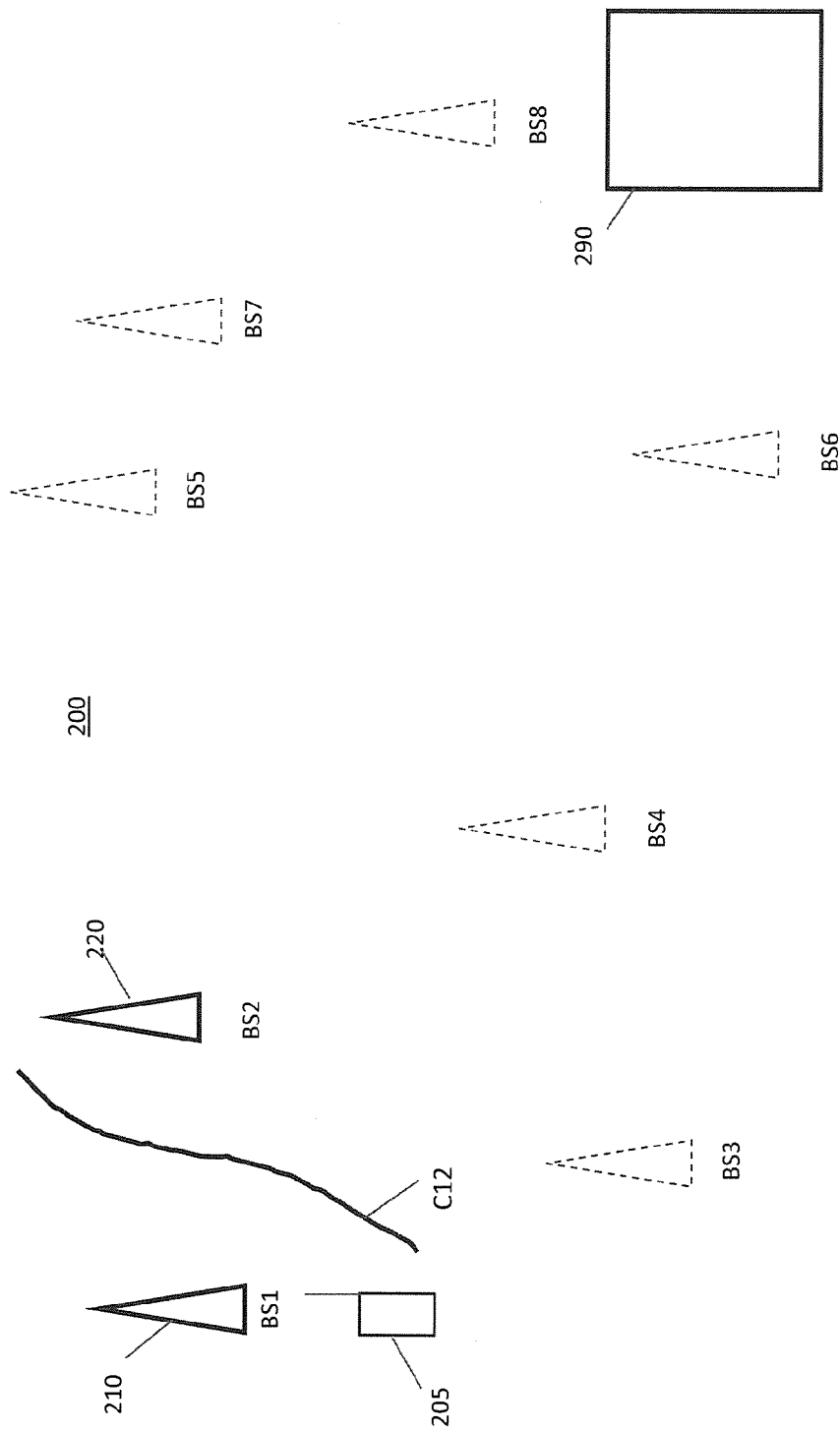
FIGS. 2, 3, 4, 5, 6, 7 and 8 are schematic diagrams, illustrating cellular wireless communication systems.

FIG. 2 shows base stations BS1-BS8 of a cellular wireless communication system 200. The base stations shown in bold in each of FIGS. 2-7 are the base stations whose activities are discussed in each figure. Other base stations are shown only with dashed lines, in order to make the figures easier to read.

A mobile communications unit 205 is shown in the cellular wireless communication system 200. Base station BS1 is shown as reference 210. Base station BS2 is shown as reference 220. A controller 290 may process call information from the base stations.

Controller 290, or another network element, may derive an estimate of the location of mobile communications unit 205 and/or the propagation model parameters.

Contour C12 is shown between base stations BS1 and BS2. Contour C12 is the line of points at which the difference in received signal powers from BS1 and BS2 has a particular constant value.

We can denote:
(i) A first signal strength received by a mobile communication unit from BS1 as 'S1', where BS1 is one possible example of a first network node; and
(ii) A second signal strength received by the mobile communication unit from BS2 as 'S2', where BS2 is another possible example of a second network node.

S1 and S2 may be the signal strengths received from an individual sector antenna that is located at each of base stations BS1 and BS2.

From S1 and S2, we can derive a difference D12, between the first signal strength S1 and the second signal strength S2. So contour C12 indicates all the points where D12 takes a particular value. We can write this as:

$$D12 = S1 - S2$$

Figure 3:
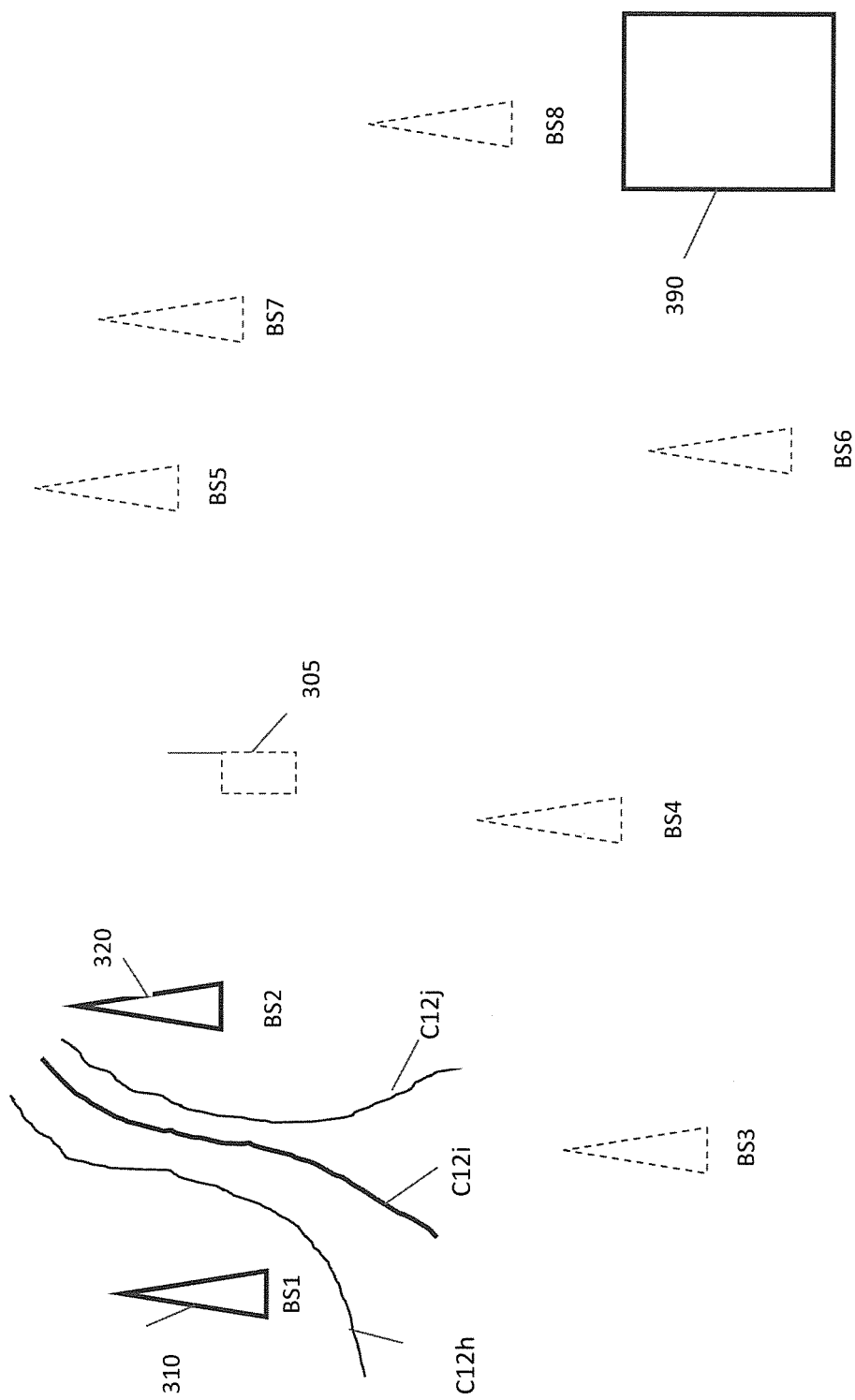

In FIG. 3, references 305, 310, 320 and 390 indicate corresponding elements to the similarly numbered elements in FIG. 2.

In FIG. 3, references 305, 310, 320 and 390 indicate corresponding elements to the similarly numbered elements in FIG. 2.

FIG. 3 shows three contours C12$h$, C12$i$ and C12$j$. Each of these contours is a line where the value of D12 takes a particular value, the value of D12 being different for each contour. It is possible to calculate each of contours C12$h$, C12$i$ and C12$j$ singly, or to develop them all together. Additional contours may be derived, for other values of D12. For the three contours shown, the values of D12 might be D12$h$, D12$i$, D12$j$. Since D12 is defined as:

$$D12 = S1 - S2$$

Then D12$h$>D12$i$>D12$j$. This is clearly the case, since contour C12$h$ is closer to BS1 than C12$i$. Contour C12$i$ is closer to BS1 than C12$j$.

Figure 4:
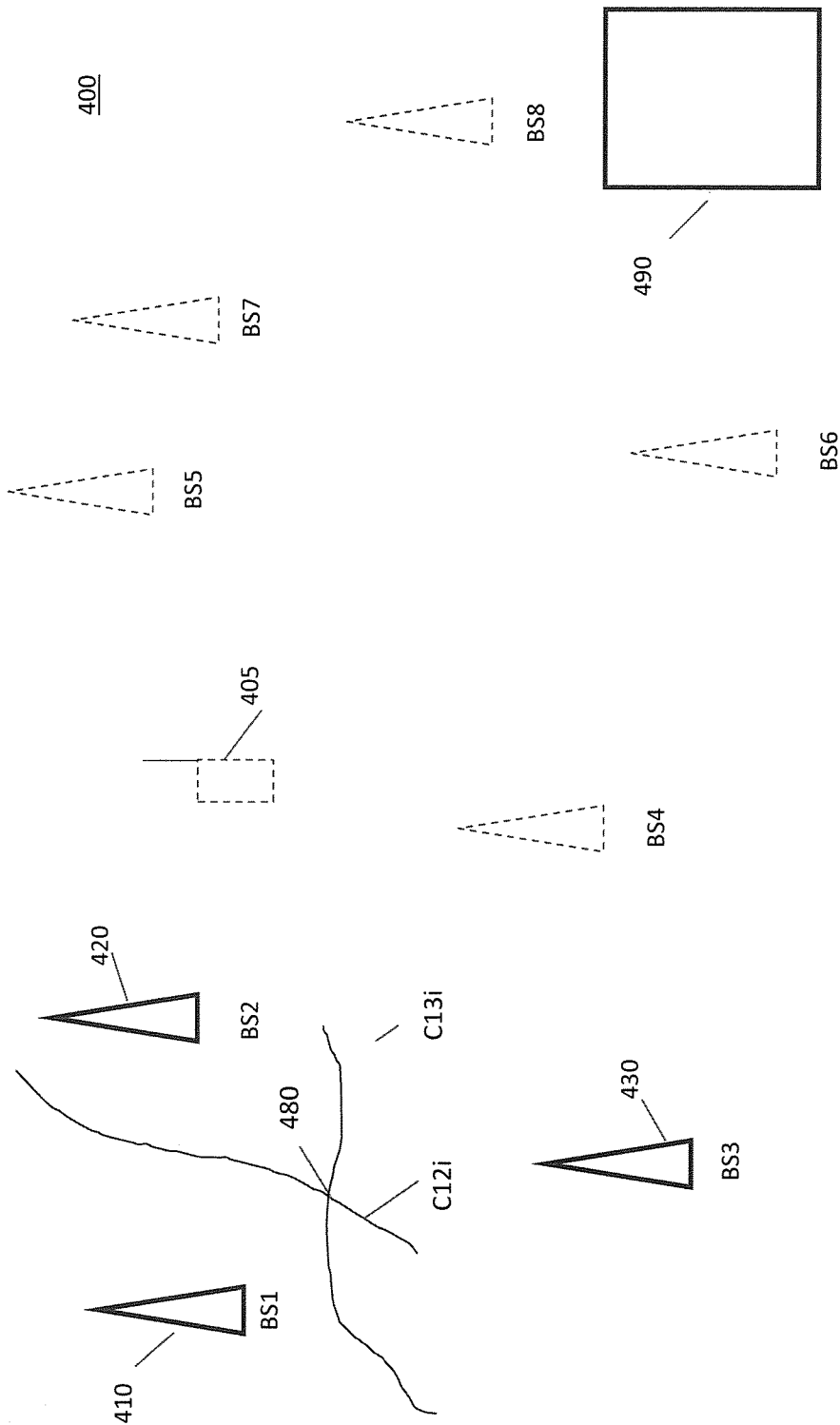

In FIG. 4, references 405, 410, 420 and 490 indicate corresponding elements to the similarly numbered elements in FIGS. 2 and 3. Contour C12$i$ corresponds to the similarly numbered contour in FIGS. 2 and 3.

Base station BS3 is labelled as reference 430 in FIG. 4. A contour C13$i$ indicates locations where the difference between received signal strengths from base stations BS1 410 and BS3 430 has a particular constant value. When considering signals from BS1 410 and BS3 430, we can use analogous notation to that for the signals represented by contours C12$h$, C12$i$ and C12$j$. Considering signal strength S3 received by a mobile communication unit from base station BS3, we can therefore write:

$$D13 = S1 - S3$$

D13$i$ would be the constant signal strength difference at all points along contour C13$i$.

Point 480 is the point where contours C12$i$ and C13$i$ cross. At point 480, a mobile communication unit can receive signal S1 from base station BS1 410, signal S2 from base station BS2 420, and signal S3 from base station BS3 430. It may in addition be possible for a mobile communication unit to receive signal S1 from base station BS1 410, signal S2 from base station BS2 420, and signal S3 from base station BS3 430 at many other locations.

Location Estimation

The situations shown in FIGS. 2-4 can be adapted to provide methods for estimating the location of a mobile communication unit. Two approaches are possible, as follows:
a) First Approach to Location Estimation:

Assume that a mobile communication unit can make and report measurements of D12 and D13 at its present location. If we know or can calculate the two contours C12 and C13 for those values of D12 and D13, then we know that the mobile communication unit is at the point where C12 and C13 cross. This crossing point, a point such as 480 on FIG. 4, is the estimate of the location of the mobile communication unit.

Note that D12 and D13 measured by the mobile communication unit are dependent only on the difference between pairs of signal strengths received by the mobile communication unit from different base stations.

The contours C12 and C13 may be pre-calculated. So, for example, controller 490 may maintain a database of contours such as C12$h$, C12$i$, C12$j$ and C13$i$. As soon as a mobile communication unit reports values of signal strengths received, or of the differences D12 and D13, the location 480 can be found from the pre-calculated contours. The contours may be calculated, for example, in 1 dB increments of the values of D12 and D13.

Instead of pre-calculating the contours, they may be calculated after the mobile communication unit reports signal strengths received, or the differences D12 and D13. In this case, only contours corresponding to the reported values of D12 and D13 will need to be calculated, and they can be calculated from the latest available propagation model parameters known to controller 490. However, they are not held ready in advance of receiving reported values of D12 and D13.

In this first approach, we can use the further information to refine the location estimate, beyond what is achievable just using the contours. Any or all of the following may be used: a measure of timing advance; antenna pointing angle; antenna radiation patterns. For example, the method may use both the following types of further information, in addition to the contour information:
(i) A pointing angle of an antenna at one or more of the first and second base stations; and
(ii) A comparison between timing advance information measured by the mobile communication unit, and timing advance information expected at points on the contour.

b) Second Approach to Location Estimation:

Assume that a mobile communication unit can only receive signals from two base stations, at its present location. In this case, it can only provide one measurement, i.e. one but not both of D12 and D13. If we know or can calculate a contour, for example C12$i$ shown in FIG. 2, then we know that the mobile communication unit is located somewhere along contour C12$i$. Contour C12$i$ would be the calculated contour if the mobile communication unit could only receive signals from BS1 410 and BS2 420.

In this approach, we can then use the available further information to refine the location estimate, for example to a restricted part of contour C12$i$.

In both of the above approaches, the absolute power levels that the mobile communication unit receives are in fact affected by such factors as building penetration loss, for indoor cells. The same is true when the mobile communication unit is in a vehicle. However the difference in received power levels from two base stations or cells provides a more robust measure, i.e. one that varies less than the variation in absolute power levels received. Even if the mobile communication unit is located in a building or vehicle, we can make the approximation that all of the signals received by the mobile communication unit will be attenuated similarly, so the difference between any two of those signals will remain unchanged.

In summary, therefore, a mobile communication unit in communication with the cellular wireless communications network of system 200 or 400 will report the received power levels of two or more cells in its vicinity. These reports can be used to create contours, which can be used for geolocation estimation.

In networks such as cellular networks 200 and 400, the following may be known:
(i) The geographical position of the cells, i.e. the spatial co-ordinates of the base station or sector antennas, which communicate with the mobile communication unit.
(ii) Pointing angles of the antennas, and antenna patterns. The pointing angles of the antennas may be held on a network configuration database, for example.
(iii) The transmit power of the cells. This is known in GSM and LTE networks, and may be communicated to the mobile communication unit.
(iv) The received power differential measured by a mobile communication unit for signals from at least two measured sectors. The power of each signal received from a base station or sector antenna may be measured by the mobile communication unit. This information is used by mobile communication units in known systems to decide when to make a request for 'handoff', i.e. a request for service to be provided from a different sector or base station than the present one. The measured signal powers may be recorded in a measurement report, which the mobile communication unit routinely transmits to the infrastructure of the cellular wireless communications system 200 or 400. The reports may be held by the controller 290 or 490, for example.

Propagation Model Parameters

Propagation model parameters describe the propagation of wireless signals throughout one or more geographical areas of the cellular wireless communications system. The geographical area may be one or more sectors or cells, for example. In some systems, there may be an initial set of propagation model parameters. The initial set may be based on knowledge of the terrain and features of one or more geographical areas of the cellular wireless communications system.

The initial set of propagation model parameters may be used by the invention. The invention may iteratively refine the propagation parameters, thereby deriving propagation model parameters that are at least one of:
(i) More up-to-date, i.e. current; and/or
(ii) More accurate;
(iii) More precise.

Accurate parameters are correct ones. Precise parameters are ones whose value is known within a very small margin. This iterative process may be continuous, and operate 24 hours a day. It will therefore provide an up to date set of propagation parameters in the model that can be used in the method of geolocation described above, whenever there is a need to geolocate a mobile communication unit. In addition, each geolocation that is performed can itself provide information that can be used to further refine the propagation parameters.

As illustrated generally in FIG. 2, and explained in more detail with regard to FIGS. 3-7, one aspect of the invention is a means of calculating one or more contours of points in a geographic area. These are the points at which the received power difference that is predicted by the propagation model parameters is equal to the received power difference measured and reported by a mobile communication unit, whose location we wish to estimate.

In this way, a contour representing the constant power difference can be constructed in a geographic area, for a reported received power differential. Typically, the propagation model and knowledge of the antennas will provide a usable contour.

The exact shape of the contour is in fact a function of various parameters, which are not all equally significant. These include the following, which are the most significant: The known geographical position of the cells; known pointing angle(s) of the antennas; known transmit power of the cells; known antenna patterns; the magnitude of received power differential; and propagation model parameters.

The propagation model parameters used in FIGS. 2-6 can be refined by using signal strength measurements from many mobile communication units. The parameters do not just rely on measurements from a small number of mobile communication units, for which a location estimate is currently being derived. However, the estimate of the location of a mobile communication unit can be fed back into the process for deriving the propagation model parameters. Since there may be hundreds, thousands or even millions of location estimates available over a period of a few tens of hours, the refinement of the propagation model parameters may lead to a precise tool for deriving individual location estimates, for individual mobile communication units, whenever such an estimate is needed.

The propagation model parameters may be derived using information from signals received by consumer mobile communication units, from network nodes of the cellular wireless communication system such as base stations BS1-BS8. This use of consumer mobile communication units contrasts with drive-by testing, which is used in many conventional systems, to gain information about signal strengths in the network. The information used by the present invention may be from signals received during calls, or from routine measurement reports provided by the consumer mobile communication units.

Contours may also be based on knowledge of one or more of:
(i) Geographical positions of either the base stations BS1-BS8, or sectors covered by antennae located at these nodes;
(ii) One or more pointing angle(s) of antenna(s) located at the network nodes BS1-BS8;
(iii) Transmit power of the cells;
(iv) Known antenna patterns. The antenna patterns may comprise horizontal and/or vertical patterns for each antenna. If the vertical antenna pattern is used, then antenna height, terrain height and/or antenna tilt may also be used.

Likelihood Functions

The various items of information and data that feed into the calculation of each location estimate have various degrees of reliability. In practice, a 'likelihood function' can be evaluated for each piece of data or information used to evaluate the location of the mobile communication unit. Then, the likelihood functions can be weighted according to the importance of the piece of data concerned, in determining the location. The various likelihood functions can then be combined, to provide an overall likelihood function for the mobile communication unit to be at the estimated location. In simple terms, it is then possible to know how certain each location estimation is.

Likelihood functions with the highest value indicate location estimates that are most likely to be accurate or precise. These estimates can then be given greater emphasis, when iteratively refining the propagation model parameters. For example, a threshold likelihood value can be defined. Only location estimates for which the likelihood value is above the threshold will then be used to refine the propagation model parameters. The other location estimates will not be used in the refining process.

The invention may allow the judicial elimination of those signal strength measurements that may be unreliable. For example:
(i) A threshold may be set, specifying a minimum absolute power level measurement. This threshold would tend to select the more reliable estimates, since not all received power levels are reliable.
(ii) A threshold may be set, specifying a maximum differential power level measurement.
(iii) Measurements from multiple sectors of the same neighbouring site may be pruned, to leave only one measurement.

Considered in more detail, the mathematical formulation underpinning the use of likelihood functions in the method of the present invention is the method of "maximum likelihood". Each piece of data used (e.g. differential power levels, pointing angle of the antenna etc.) has an associated likelihood function that describes, for each geographical location, the likelihood of the mobile station being at that location. Weighting is done for the functions, according to importance in determining the mobile location. The weighted functions are then combined. Weighting all such likelihood functions, and combining them, results in an overall likelihood function.

We can denote a likelihood function as L. Specifically, for N such likelihood functions L, the score for a candidate location is:

$$\prod_{i=1}^{N} (L_i)^{w_i}$$

Here w is a number that represents the "weight". More usually the expression below is used:

$$\sum_{i=1}^{N} w_i \times \log(L_i)$$

The above function must be evaluated at sample points, which are 'candidate' points, where might be the most likely location for the mobile communication unit. The sample points may be selected by many techniques. For example, sample points may be spaced on a rectilinear grid or polar grid of certain resolution, or they may be randomly placed. The extent of the geographic area over which sample points are placed may be based on the positioning of the cells. This may include both observed cells, and those that are not observed. The geographic area over which sample points are placed may also or instead be based on timing advance.

Figure 9:
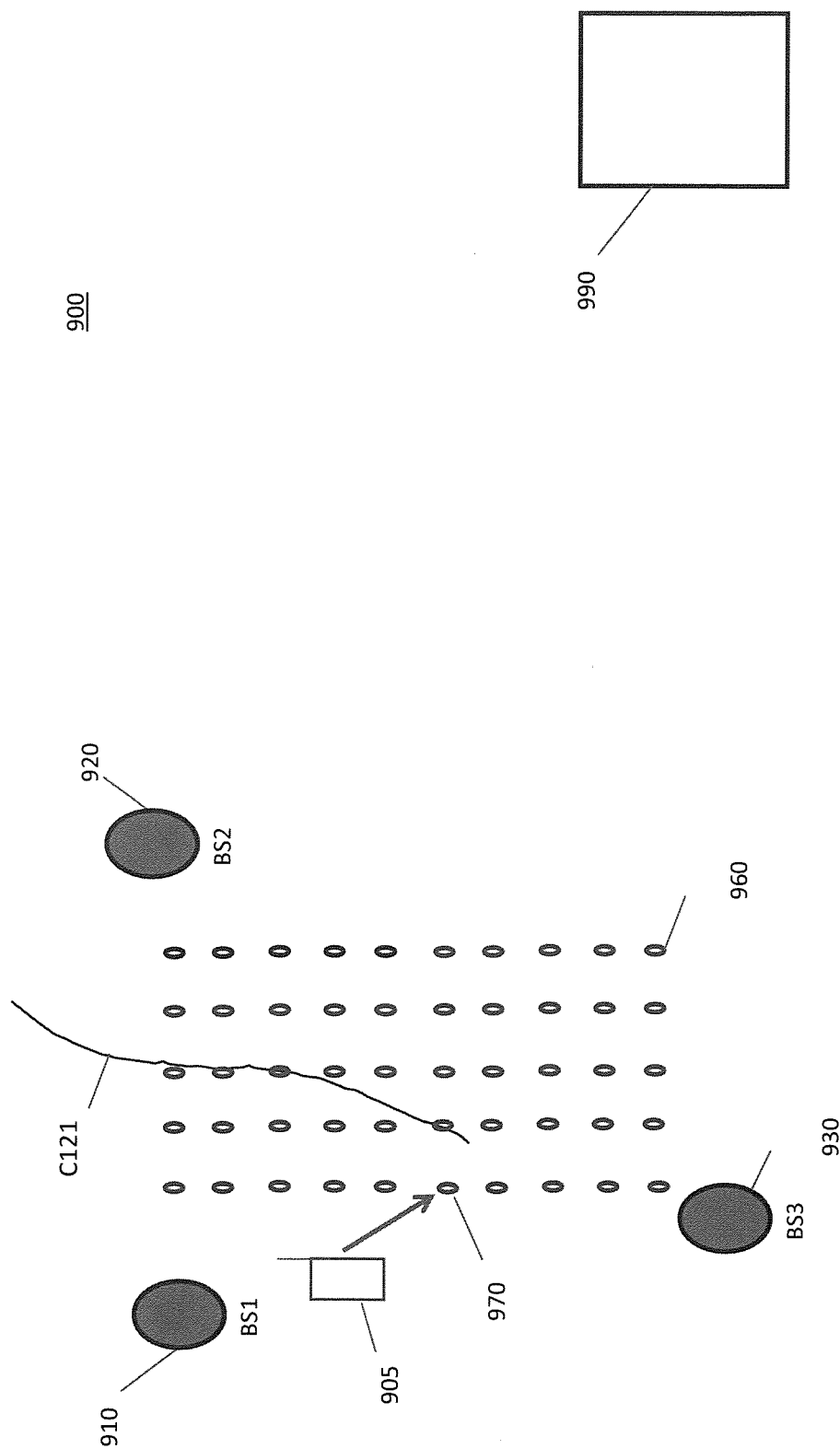
FIG. 9 is a plan view of a cellular wireless communication system.

Once the sample points are known, the likelihood function for each sample point can be evaluated, according to the above formula. Then one or more points can be selected, as the estimated or likely location. The selection of the point(s) may be according to one of many possible techniques, e.g. selecting the most likely location, or using the technique of weighted random selection from all candidate points etc. This provides the point with the 'highest' likelihood score. These aspects of the invention are illustrated in FIG. 9, which is described later.

The likelihood functions may differ, in different applications of the invention. Their weighting may be actively varied.

Sets of Contours

The pre-calculated contours described above under the subheading 'First approach to location estimation' may form sets of contours. One set of contours may be derived for signals from each pair of base stations. This explained in connection with FIG. 5.

Figure 5:
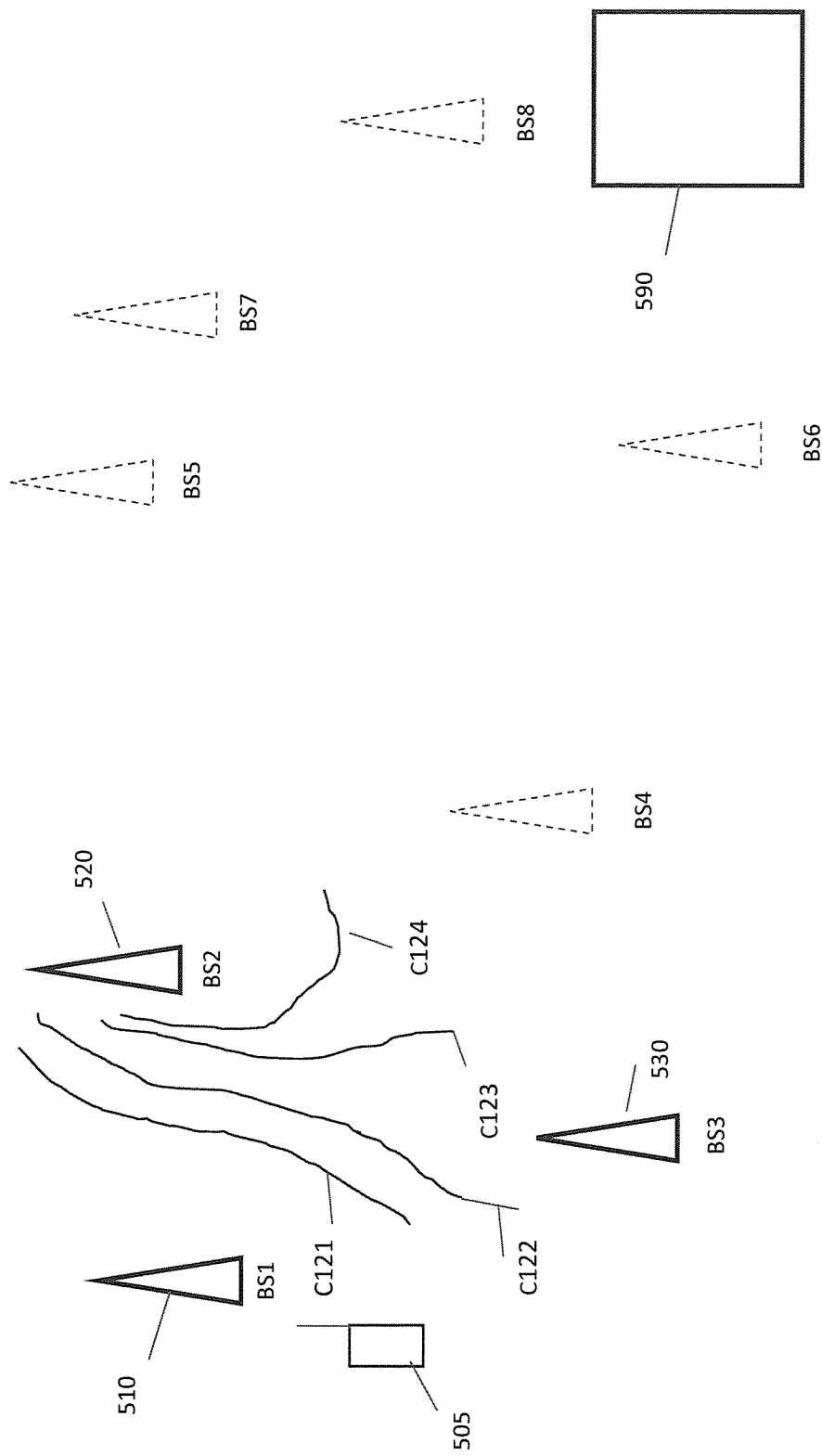

In FIG. 5, references 505, 510, 520 and 590 indicate corresponding elements to the similarly numbered elements in FIG. 4. FIG. 5 illustrates a set of contours C121, C122, C123 and C124. Each of these contours represents a constant value of the difference D12 between the signal strength received by a mobile communication unit 505 from BS1 510 and BS2 520. The values of D12 may differ by a fixed amount between successive contours, for example 1 dB.

Figure 6:
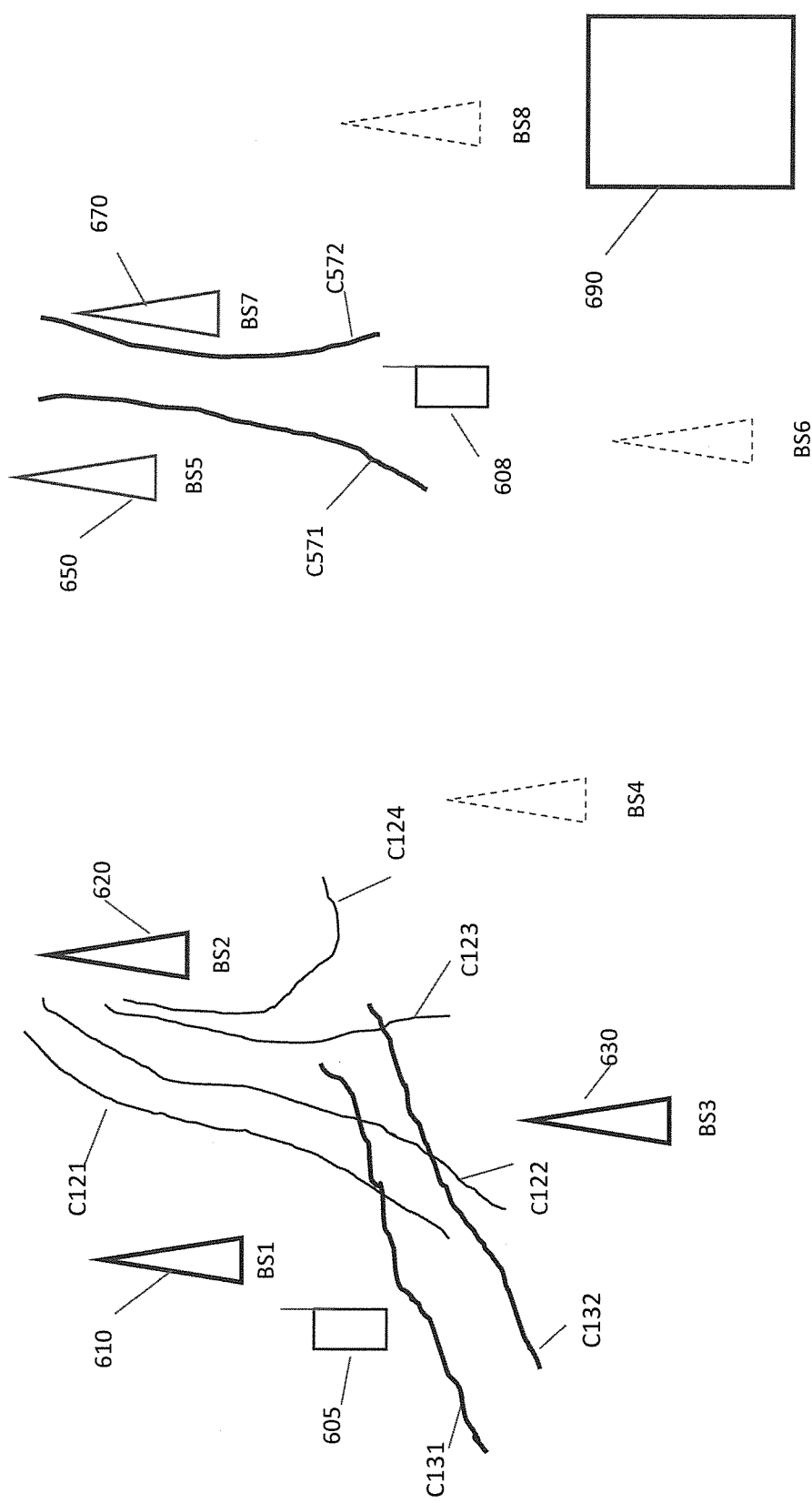

In FIG. 5, it is assumed that mobile communication unit 505 is able to receive signals from each of three base stations BS1 510, BS2 520 and BS3 530. In this case, a second set of contours can also be calculated, for the difference D13 in received signal strength from BS1 510 and BS2 530. Examples of these contours are shown in FIG. 6. It is also possible to calculate a third set of contours, for constant values of the received signal strength from base stations BS2

520 and BS3 530. However, the three sets of contours are not all independent, and it may therefore be preferred to calculate and/or use only two of the three sets.

FIG. 6 shows two contours C131 and C132, for the difference D13 in signal strength received by a mobile communication unit from BS1 510 and BS3 530. Contours C131 and C132 have been shown in darker font than contours C121, C122, C123, C124, in order to distinguish them visually on FIG. 6. It is immediately clear that there are several crossing points between even the six contours illustrated in FIG. 6 in the vicinity of base stations BS1-BS3.

We can use variables S10, S20, S30 for received signal strengths and D120 and D130 for the differences between received signal strengths, to describe the arrangement of FIGS. 5 and 6. This distinguishes the notation used for FIGS. 5 and 6, and the sets of contours, from that in FIG. 4 that used variables S1, S2, S3, D12 and D13. The differences in received signal strength D120 and D130 will take different values, for each contour described in FIGS. 5 and 6.

FIGS. 5 and 6 therefore involve:
(i) A first signal strength S10, received from a first network node BS1;
(ii) A second signal strength S20, received from a second network node BS2;
(iii) A third signal strength S30, received from a third network node BS3;
(iv) Contours each having a fixed value of D120=S10−S20; and
(v) Contours each having a fixed value of D130=S10−S30.

The method of contour calculation illustrated in FIGS. 5 and 6 thus comprises the following two steps, in any order:
(i) Deriving a first set of contours, such as C121, C122, C123, C124, from propagation model parameters. Each member of the first set of contours indicates locations having a constant value of a first difference D120, between the first signal strength S10 and the second signal strength S20.
(ii) Deriving a second set of contours C131 and C132, from propagation model parameters. Each member of the second set of contours indicates locations having a constant value of a second difference D130, between the first signal strength S10 and the third signal strength S30.

Estimating the location of the mobile communication unit 605 within a geographical area, such as that generally between or close to base stations BS1 610, BS2 620 and BS3 630, may then involve the following three steps. Steps (i) and (ii) can be performed in any order:
(i) Identifying a first contour, from the first set of contours. The first contour is the contour having a first difference D120 that is equal to the value of received signal strength difference measured/reported by the mobile communication unit, for signals from the first network node BS1 610 and the second network node BS2 620.
(ii) Identifying a second contour from the second set of contours. The second contour is the contour having a second difference D130 that is equal to the value of received signal strength difference measured by the mobile communication unit, for signals from the first network node and the third network node.
(iii) Estimating the location of the mobile communication unit as being the point where the first and second contours cross.

Controller 690 may therefore derive a location estimate for the mobile communication unit 605. That location estimate, together with the reported signal strength values S10, S20 and S30, may then be used to refine the propagation model, parameters themselves. Other network variables may also be estimated or refined, using the location estimate and/or S10, S20 and S30.

Towards the right of FIG. 6, base station BS5 650 and BS7 670 are also providing signals that can be received by a mobile communication unit 608 located in the vicinity. Contours C571 and C572 can be derived from propagation model parameters describing the region around base station BS5 650 and BS7 670.

We can denote the signal strength received at any point from base station BS5 as 550 and the signal strength received at any point from base station BS7 as S70. Contour C571 indicates points having a difference in signal strength equal to D570, where:

$$D3570=S50-S70$$

The value of D570 for all points on contour C571 is constant, and greater than the value of D570 for all points on contour C572. Contours C571 and C572 are two members of a set of contours, which may be derived for differences D570 in received signal strength from base stations BS5 and BS7. These contours may be derived, for example by, controller 690.

The set of contours of expected signal strength at locations between base stations BS5 650 and BS7 670 may be derived in advance. Then a particular contour from the set will be selected, when a mobile communication unit 608 provides measurements of received signal strength, or received signal strength difference D570, from its present location. Alternatively, the system may wait until a mobile communication unit 608 provides measurements of received signal strength, or received signal strength difference D570, from its present location, and then only derive the contour for the report value of D570. The remaining members of the set would not be calculated.

If mobile communication unit 608 can also receive signals from base station BS6, for example, then contours for signal strength difference between base station BS6 and either or both of BS5 and BS7 could also be derived and used in the location estimation. So contours for either difference D560 or D670 would be used.

Once again, the set of contours may be pre-calculated. Alternatively, when mobile communication unit 608 provides measurements of received signal strength, or received signal strength difference D560 or D670, from its present location, the method may then only derive the contour for the relevant value of D560 or D670.

Figure 7:
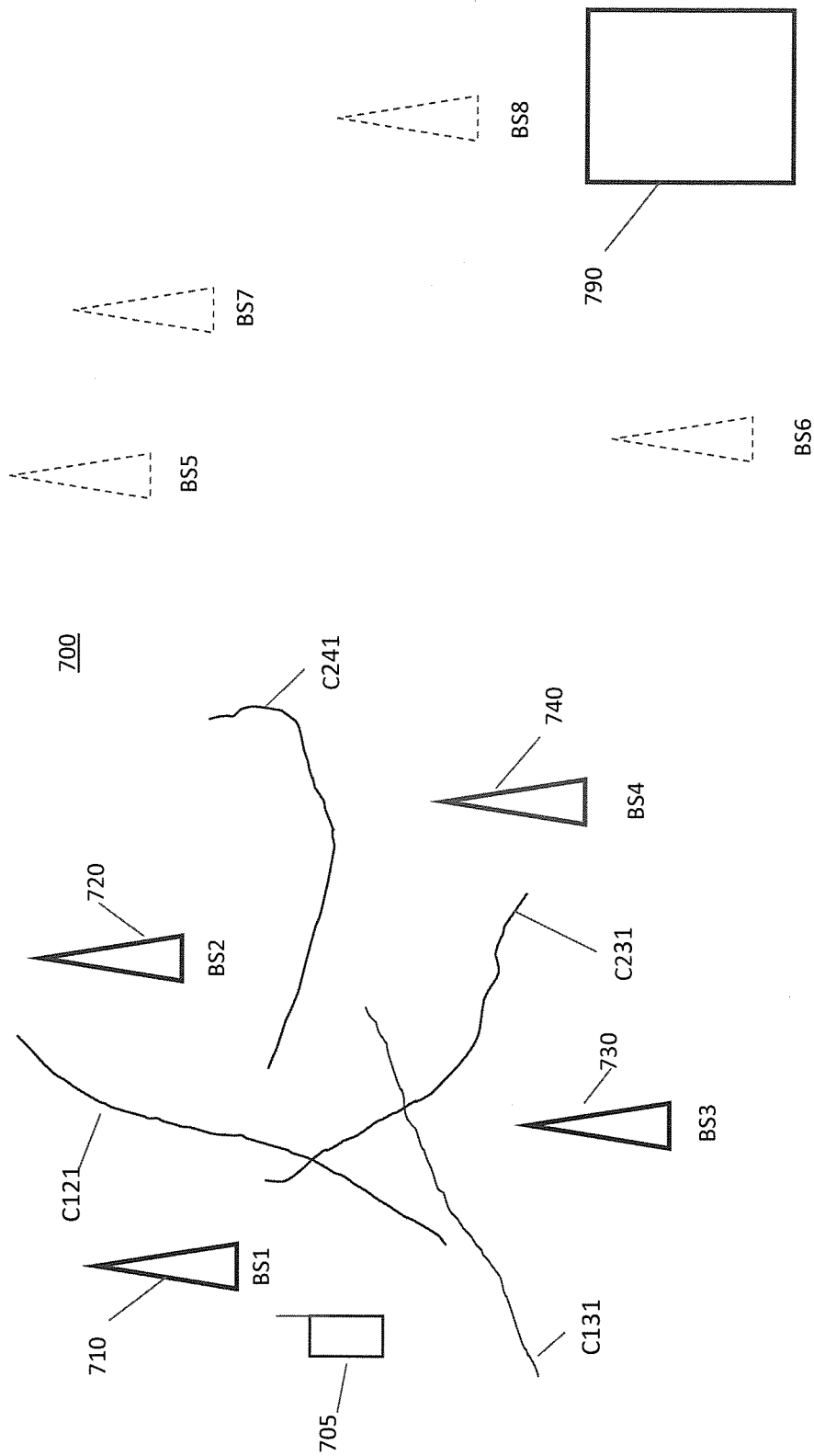

FIG. 7 shows a part of a cellular wireless communications system 700 corresponding to that of FIGS. 2-6. In FIG. 7, an example is shown of a mobile communication unit 705 that can receive signals from four base stations. These are base stations BS1 710, BS2 720, BS3 730 and BS4 740. In order to estimate the location of mobile communication unit 705, many contours may be available.

Contours C121, C131, C231 and C241 are shown. Contour C121 is a contour of constant signal strength difference for signals from BS1 710 and BS2 720. Contours C131, C231 and C241 follow this numbering convention, with the first two numerals indicating the pair of base stations concerned. However, further contours may be constructed for different pairs of base stations, and these further contours are not shown on FIG. 7. For example, a contour C141 for signals from BS1 710 and BS4 740, and a contour C231 for signals from BS2 720 and BS4 740 may be constructed. Each contour shown on FIG. 7 is just one of the contours that can be derived between each pair of base stations.

In the general case where signals from a total number n base stations BS1 ... BSi ... BSn can be received at a given location, it may be possible to calculate up to n(n−1) sets of contours. However, these are not all based on independent measurements. So in practice up to n−1 contours may be calculated and used. Typically, a mobile communication unit is registered with one serving cell or base station. So the n base stations comprise the serving base station, plus n−1 other base stations, from which the mobile communication unit can receive a measurable signal strength.

FIG. 7 is designed to show clearly some examples of the various contours that may be derived for pairs of base stations from the set BS1-BS4. If a mobile communication unit 705 were to provide actual measurements of signal strength for each of BS1-BS4, then these measurements would all be for a single, unknown location of the mobile communication unit 705. The contours that would then be derived, or obtained from a pre-calculated set, would then all run through or very close to the single location of the mobile communication unit 705. These contours would not be as shown on FIG. 7, since illustrative contours C121, C131, C231 and C241 do not all run through the same single location.

In a practical application, estimation of a location of a mobile communication unit 705 may comprise:
(i) Deriving at least three contours, using a weighted likelihood function for each piece of data used to derive each contour; and
(ii) Estimating the location of the mobile communication unit 705, on the basis of the weighted contour information.

Once this location estimate has been obtained, the estimated location of the mobile communication unit 705 may be used to refine the propagation model parameters.

Figure 8:
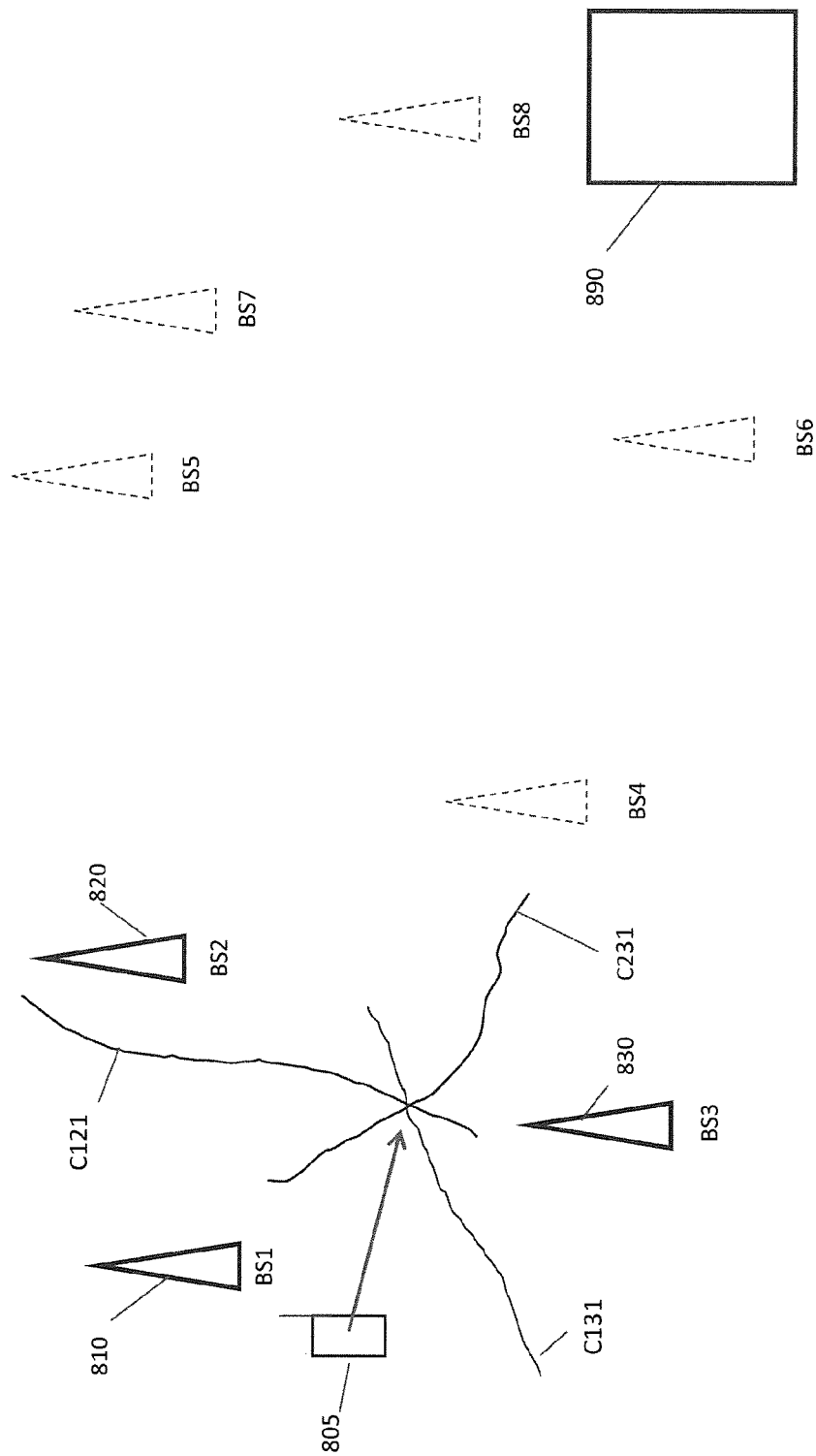

FIG. 8 shows this specific example, where exactly three contours are derived, from base stations BS1-BS3. Contours C121, C131 and C231 all run through the location of mobile communication unit 805. This is an idealised outcome. In reality, the three contours C121, C131 and C231 may provide an approximately triangular area. The mobile communication unit reporting the particular signal strength values from base stations BS1-BS3 (that correspond to contours C121, C131 and C231 calculated from the propagation model parameters) is likely to be in or near to that triangular area.

FIG. 9 shows an embodiment of one method of estimating a location of a mobile communication unit in a cellular wireless communications system 900.

In contrast to FIGS. 1-8, FIG. 9 is a schematic plan view of cellular wireless communications system 900. Base stations BS1 910, BS2 920 and BS3 930 correspond to the similarly numbered base stations of FIGS. 2-8, but are viewed from above. Mobile communication unit 905, exceptionally, is not shown in plan view, in order to make clear what it is. Contour C121 is also shown on FIG. 9, since one or more contours may be used in the method illustrated in FIG. 9.

A grid of points 960 is illustrated in FIG. 9. The points in the grid 960 are not physical objects or features within the network. Rather, they represent a set of spatial locations in the cellular wireless communications system 900 at which an evaluation of location probabilities will be performed.

The method illustrated in FIG. 9 comprises:
(i) Deriving a first estimate of the position of a mobile communication unit, from at least one received signal power difference, for signals received by the mobile communication unit 905 from at least two network nodes. This derivation may provide the contour C121, and other similar contours as described in FIGS. 2-8.
(ii) Deriving a first likelihood function, for the first estimate. The first likelihood function indicates the probability that the mobile communication unit 905 is at each spatial location in the cellular wireless communications system 900. The likelihood of mobile communication unit 905 being at a certain distance away from the contour C121 may, for example, fall off as a function of the distance from contour C121.
(iii) Deriving at least one second estimate of the position of the mobile communication unit 905, from further information. The further information that may be used includes: a measure of timing advance, for signals received by the mobile communication unit; antenna pointing angle; or antenna radiation patterns. Either the actual pattern, or a simplified model, may be used.
(iv) Deriving a likelihood function, for each of the at least one second estimate. Each likelihood function, for one of the at least one second estimates, indicates the probability that the mobile communication unit is at each spatial location in the cellular wireless communications system. This likelihood function will also, typically, reduce as a particular function of the distance away from the second estimate of the position of the mobile communication unit 905.
(v) Weighting the first likelihood function, based on the reliability of the first estimate.
(vi) Weighting each second likelihood function, based on the reliability of the corresponding second estimate.
(i) Combining the weighted first and second likelihood functions.
(ii) Selecting one or more locations, as the estimated location.

In FIG. 9, the above method leads to point 970 as the estimated location of mobile communication unit 905.

The step of selecting one or more locations as the estimated location(s) may comprise selecting the locations with the highest likelihood score. This can be achieved by various approaches, including either:
(i) selecting the most likely location, or
(ii) using a technique of weighted random selection, from all candidate points.

The step of combining the weighted first and second likelihood functions may comprise the following sub-steps. These sub-steps are carried out for each point of the set of points 960:
(i) evaluating the weighted first likelihood function for each point of the set of points 960;
(ii) evaluating the weighted second likelihood function for each point of the set of points 960;
(iii) for each point of the set of points 960, combining the values of the weighted first likelihood function, and each of the second likelihood functions;
(iv) selecting the one or more points where the combined values are highest, as the estimated location(s) for the mobile communication unit within the geographical area.

The set of points 960 shown in FIG. 9 comprises sample points that are spaced on a rectilinear grid. However, other configurations for the set of points may be used. For example, the points may be spaced on a polar grid, or randomly spaced.

The extent of the geographic area over which the sample points of set 960 are placed may similarly be decided in one of several ways. For example, the extent of the geographical area may be based on the positioning of the base stations, or cells. Alternatively, the extent of the geographic area may be defined by ranges of timing advance, for signals in the system. A controller 990 may define the area within which sample points are placed, by setting upper and lower thresholds of timing advance, for signals in the cellular mobile communications network.

The 'further information' discussed above may be used in various ways. Firstly, it may further improve the accuracy of the location estimate. This may help when, for example, three contours corresponding to contours C121, C132 and C231 in FIG. 8 do not meet at a single point.

Secondly, the further information may resolve ambiguities in, for example, cases when contours of equal power differences intersect in more than one location. This is the case where there is a 'loop' in, for example, the contours C12$i$ and C13$i$ in FIG. 4. If contours C12$i$ or C13$i$ cross two or three times, instead of the single crossing at point 480 shown in FIG. 4, then the additional information can be used to help resolve which crossing point is the most probable location of the mobile communication unit 405 or 905.

Thirdly, the further information can also be used to resolve ambiguities when fewer than two contours are available. This is the situation when fewer than three signal strength measurements are reported by a mobile communication unit. So, when signals can only be received from two base stations, only one contour or set of contours can be derived. In this situation, the further information is used to "narrow down" the possible locations, rather than resolve ambiguities per se. Typically, the further information allows an estimate to be made that the mobile communication unit is in a particular part of the contour.

The additional information may be one of the following:
(i) The pointing angle of the antennae. The likelihood of a candidate location may be emphasised or de-emphasised, according to its bearing relative to the pointing angle of the antenna.
(ii) The timing advance. The likelihood of a candidate location may be emphasised or de-emphasised, according to how well the timing advance reported by the mobile communication unit agrees with the expected timing advance at that location.
(iii) The location of the unobserved sectors. Locations in the vicinity of sectors or base stations for which the mobile communication unit has not received signals, may be de-emphasised.

In the case that when more than two contours can be constructed from signals received from more than three base stations, the additional contours are used to further refine/re-enforce/resolve the estimated location. See again the explanation given in connection with FIG. 7.

Deriving Propagation Model Parameters

There are several approaches to the method of deriving propagation parameter values. The overall aim is to derive 'optimal' propagation model parameters, which closely match the real situation within the network. The approaches are based at least in part on the use of measurements of signal strength reported by subscriber mobile communication units, such as units 505, 605, 608, 705, in the wireless communication system. These measurements concern signal strengths received by mobile communication units from network nodes, such as base stations BS1-BS8 shown throughout FIGS. 2-7.

Firstly, methods of refining a 'current' set of propagation parameter values are considered.

The method may comprise estimating the location of all calls, for all mobile communication units for which measurements are available. This set of calls may comprise many thousands or millions of calls. Each location estimate may itself be based on weighted values of likelihood functions, for each piece of data used to evaluate the location of the mobile communication unit making the call. The estimated locations of the calls can then be used to adjust the propagation parameter values themselves, in a direction that provides an improved fit of the estimated locations of the calls.

These steps of locating all calls, and adjusting the propagation parameter values can then be repeated, until convergence has been achieved.

A decision may be made that convergence has been achieved when either:
(i) the propagation parameter values do not change significantly from one iteration to the next; or
(ii) a metric that measures the 'goodness of fit' of the model to the data does not improve for a number of iterations.

The step of adjusting the propagation parameter values may, for example, involve carrying out a linear regression analysis of pathloss. This linear regression may use an aggregate of all measurements, from mobile communication units that report received signal strength from a given sector. This linear regression then provides values of a regression slope and an intercept, which would usually be for one sector of the cellular mobile communications system. The slope and intercept values can then be adjusted, to better fit the data.

Alternatively, the step of adjusting the propagation parameter values may, for example, involve adjusting the propagation parameter values in accordance with one of many mathematical optimisation techniques. One example of such an optimisation technique is the 'local search'. Other examples of mathematical optimisation techniques are the many available metaheuristic methods. However, a structured trial and error approach may also be used.

Each of these approaches to adjusting the propagation parameter values may be continued until convergence has been achieved. The propagation parameter values used in the model may be:
(i) the rate at which the power level attenuates with distance; and
(ii) the attenuation of power at a reference distance.

FIG. 10 is a flowchart, illustrating a method in accordance with the approach described above.

How to Create and Refine the Model or Propagation Parameters

The estimation of propagation model parameters is based on an initial set of model parameters. The initial set does not need to be particularly precise, since the iterations of the inventive method, as shown in FIG. 10, will refine them. The initial set may be calculated from known data about at least one sector of the cellular wireless communications system. Some of the initial set of propagation model parameters may incorporate known techniques, such as drive-by testing.

The iterative method of estimating the propagation model parameters may include the following technique. The steps below are applied repeatedly to a 'current' set of parameters, to develop a next set of refined parameters. Then the method is repeated on that next set of parameters. For the first run through the steps below, the current set of parameters is the initial set. The approach below is illustrated by application to the example of the so called "per-sector single slope-intercept" model, by way of example. The iterative method of the invention may be applied to other suitable models.

Step 1. Set starting values for the parameters to be estimated. Each sector under study would have two associated parameters: slope and intercept Step 2. Using the geolocation technique as described above, estimate the location of all calls for which measurements are available.

Step 3. The estimated locations obtained in Step 2 will be different to those locations that will fit the model using the parameter values set in Step 1. Therefore adjust the model parameters accordingly. The adjustment may be made as follows, for a single slope-intercept model:

(iii) For each sector, using the aggregate of all measurements that report that sector, carry out the linear regression analysis of pathloss against log 10 (distance).

This analysis yields a slope, the "regression slope", and an intercept, the "regression intercept"

(ii) Adjust the slope according to:

New slope=old slope+alpha×(regression slope−old slope)

(iii) Adjust the intercept according to:

New intercept=old intercept+alpha×(regression intercept−old intercept)

In points (ii) and (iii) above, alpha is a number that takes a value greater than 0 and less than or equal to 1.

Step 4. With the adjusted parameters, repeat the steps from Step 2, until convergence. Convergence may be defined in any number of ways, e.g. when the parameter values do not change significantly from one iteration to the next; or when a metric that measures the goodness of fit of the model to the data does not improve for a number of iterations.

A more sophisticated propagation model than the single slope intercept model for a sector may be used. For example, a multi-slope model and/or with multiple azimuthal segments, may be employed.

Various aspects of the present invention as illustrated above in connection with FIGS. 2-10 may provide any or all the following advantages:

Swift, efficient geo-location of GSM & LTE users, without being impeded by penetration-loss details that are generally unknown in prior art systems.

Estimation of path-loss models, which can themselves be used for other purposes than location estimation. They may be the basis for planning improvements to the network.

The invention does not require references signatures. These can be difficult to obtain.

The inventive concept herein described may be implemented within cellular communication networks adapted in accordance with various alternative wireless communication technologies and standards. Furthermore, the inventive concept may be implemented in a wide variety of signal processing circuits. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

A computer-readable storage device may be provided, the storage device having stored executable program code for programming signal processing logic to perform the method of the invention. The computer-readable storage device may comprise at least one of: a hard disk, a CD-ROM, an optical storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

It will be appreciated that, for clarity purposes, the above description has described embodiments of the invention with reference to different functional units and processors. However, it will be apparent that any suitable distribution of functionality between different functional units or processors For example, functionality illustrated to be performed by the separate controller of FIGS. 2-9 may be performed by other processors or controllers. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, a system and method for processing communication session data from a cellular mobile communications system has been provided. Also provided are: a corresponding method; and a computer-readable storage device having executable program code stored therein for programming signal processing logic to perform the method of the invention.

What is claimed is:

1. A method of estimating a location of a mobile communication unit in a cellular wireless communications system, the method comprising the steps of:
deriving a first estimate of the position of a mobile communication unit, from at least one received signal power difference, for signals received by the mobile communication unit from at least two network nodes;
deriving a first likelihood function for the first estimate, the first likelihood function indicating the probability that the mobile communication unit is at each spatial location in the cellular wireless communications system;
deriving at least one second estimate of the position of the mobile communication unit, from further information;
deriving a second likelihood function for each of the at least one second estimates, the second likelihood function indicating the probability that the mobile communication unit is at each spatial location in the cellular wireless communications system;

weighting the first likelihood function, based on the reliability of the first estimate;

weighting each second likelihood function, based on the reliability of the corresponding second estimate;

combining the weighted first and second likelihood functions to provide an overall likelihood function for the probability that the mobile communication unit is at each spatial location in the cellular wireless communications system; and selecting one or more spatial locations in the cellular wireless communications system as the estimated location based on the overall likelihood function.

2. A method of estimating a location of a mobile communication unit in accordance with claim 1, wherein the further information comprises at least one of the following:

a measure of timing advance, for signals received by the mobile communication unit;

antenna pointing angle or antenna radiation patterns.

3. A method of estimating a location of a mobile communication unit in accordance with claim 1, wherein selecting one or more locations as the estimated location comprises selecting the one or more locations with the highest likelihood score, by either:

(i) selecting the most likely location, or (ii) using a technique of weighted random selection, from all candidate points.

4. A method of estimating a location of a mobile communication unit in accordance with claim 1, wherein combining the weighted first and second likelihood functions comprises, for each point of a set of points distributed spatially in a geographical area of the cellular wireless communications system:

evaluating the weighted first likelihood function for each point of the set of points;

evaluating the weighted second likelihood function for each point of the set of points;

for each point of the set of points, combining the values of the weighted first and second likelihood functions;

selecting the one or more points where the combined values are highest, as the estimated location(s) for the mobile communication unit within the geographical area.

5. A method of estimating a location of a mobile communication unit in accordance with claim 4, wherein the set of points comprises sample points that are either:

(i) spaced on a rectilinear grid; or (ii) spaced on a polar grid;

(iii) randomly spaced; and the extent of the geographical area over which the sample points are placed is based on either:

(i) the positioning of the base stations or cells; or (ii) ranges of signal timing advance.

6. A method of estimating a location of a mobile communication unit in accordance with claim 1, further comprising the steps of:

deriving two or more second estimates of the position of the mobile communication unit, each second estimate based on one of the following:

a measure of timing advance, for signals received by the mobile communication unit; antenna pointing angle; antenna radiation patterns; or an absolute level of one or more signals received by the mobile communication unit;

and the method further comprising the step of:

deriving a likelihood function for each of the at least two second estimates, each likelihood function indicating the probability that the mobile communication unit is at each spatial location in the cellular wireless communications system;

weighting each of the at least two second likelihood functions, based on the reliability of each corresponding second estimate;

combining the weighted first likelihood function and each weighted second likelihood function, to provide an overall combined likelihood function; and selecting one or more locations, from the overall combined likelihood function, as the estimated location (s).

7. A method of estimating a location of a mobile communication unit in accordance with claim 1, further comprising the step of:

applying a lower likelihood or weighting to spatial locations in the vicinity of sectors or base stations, for which the mobile communication unit has not received signals.

8. A method of geolocating a mobile communication unit in a cellular wireless communications system, the cellular wireless communications system comprising network nodes and mobile communication units, the method comprising the steps of:

deriving propagation model parameters, using signals received by mobile communication units from network nodes of the cellular wireless communication system;

estimating a location of a mobile communication unit within a geographical area of the cellular wireless communications system in accordance with claim 1, wherein the first estimate of the position of a mobile communication unit is derived based on:

(i) at least one received signal power difference measured by the mobile communication unit, for signals received within the geographical area from at least two network nodes; and (ii) at least one contour (C121) indicating locations within the geographical area having constant received signal strength difference for signals received from the at least two network nodes, the at least one contour being derived from the propagation model parameters.

9. A method in accordance with claim 8, further comprising:

deriving the propagation model parameters using information from signals received by consumer mobile communication units from network nodes of the cellular wireless communication system, the information either being from signals received during calls, or from routine measurement reports provided by the consumer mobile communication units.

10. A method in accordance with claim 8, further comprising the at least one contour (C121) also being based on knowledge of one or more of:

geographical positions of the network nodes or sectors covered by antennae located at the nodes; one or more pointing angle(s) of antenna(s) located at the nodes; transmit power of the cells; and known antenna patterns.

11. A method in accordance with claim 10, further comprising the steps of:

(i) evaluating a likelihood function for each piece of data used to evaluate the location of the mobile communication unit;

(ii) weighting the likelihood functions according to the importance of the piece of data concerned in determining the location; and (iii) combining the results in an overall likelihood function.

12. A method in accordance with claim 8, further comprising, for a first signal strength S1 received by the mobile communication unit from a first network node, a second signal strength S2 received by the mobile communication unit from a second network node, and a third signal strength S3 received by the mobile communication unit from a third network node:
- deriving a first difference D12, between the first signal strength S1 and the second signal strength S2; and
- deriving a second difference D13, between the first signal strength S1 and the third signal strength S3;
- deriving a first contour (C121), the first contour indicating all locations having a difference between the first signal strength S1 and the second signal strength S2 equal to D12; and
- deriving a second contour (C131), the second contour indicating all locations having a difference between the first signal strength S1 and the third signal strength S3 equal to D13; and
- estimating the location of the mobile communication unit as being the point where the first and second contours cross.

13. A method in accordance with claim 8, wherein for a first signal strength S10 received from a first network node, a second signal strength S20 received from a second network node, and a third signal strength S30 received from a third network node performing the steps of:
- deriving a first set of contours, each member of the first set of contours indicating locations having a constant value of a first difference D120 between the first signal strength S10 and the second signal strength S20; and
- deriving a second set of contours, each member of the second set of contours indicating locations having a constant value of a second difference D130 between the first signal strength S10 and the third signal strength S30.

14. A method in accordance with claim 13, wherein the location of the mobile communication unit within the geographical area is estimated by:
- identifying a first contour from the first set of contours, the first contour having a first difference D120 equal to the value of received signal strength difference measured by the mobile communication unit for signals from the first network node and the second network node;
- identifying a second contour from the second set of contours, the second contour having a second difference D130 equal to the value of received signal strength difference measured by the mobile communication unit for signals from the first network node and the third network node; and
- estimating the location of the mobile communication unit as being the point where the first and second contours cross.

15. A method in accordance with claim 8 wherein for a first signal strength S1 received by the mobile communication unit from a first network node, a second signal strength S2 received by the mobile communication unit from a second network node performing the step of:
- deriving a difference D12 between the first signal strength S1 and the second signal strength S2;
- deriving a contour, the contour indicating all locations having a difference between the first signal strength S1 and the second signal strength S2 equal to D12;
- estimating the location of the mobile communication unit by combining the contour with additional information about either or both of:
  (i) a pointing angle of an antenna at one or more of the first and second nodes; and
  (ii) a comparison of timing advance information measured by the mobile communication unit and timing advance information expected at points on the contour.

16. A method in accordance with claim 8, further comprising the steps of:
- deriving at least three contours, using a weighted likelihood function for each piece of data used to derive the contour; and
- estimating the location of the mobile communication unit on the basis of the weighted contour information.

17. A method in accordance with claim 16, further comprising the step of:
- using the estimated location of the mobile communication unit to refine the propagation model parameters.

18. A method in accordance with claim 8, wherein deriving propagation parameter values by the steps of:
  (i) estimating the location of all calls, for all mobile communication units for which measurements are available, each location estimate being based on weighted values of likelihood functions for each piece of data used to evaluate the location of the mobile communication unit;
  (ii) adjusting the propagation parameter values in a direction that provides an improved fit of the estimated locations of the calls; and
  (iii) repeating steps (i) and (ii) until convergence has been achieved.

19. A method in accordance with claim 18, wherein convergence has been achieved when either:
  (i) the parameter values do not change significantly from one iteration to the next; or
  (ii) a metric that measures the goodness of fit of the model to the data does not improve for a number of iterations.

20. A method in accordance with claim 18, wherein adjusting the propagation parameter values involves either:
  (i) using an aggregate of all measurements that report a sector, to carry out a linear regression analysis of path-loss, thereby providing a value for a regression slope and a value for an intercept, and adjusting the slope and intercept values to better fit the data;
  (ii) adjusting the propagation parameter values using a local search; or
  (iii) adjusting the propagation parameter values using a metaheuristic method.

21. A method in accordance with claim 8, wherein the propagation parameter values are:
- the rate at which the power level attenuates with distance; and
- the attenuation of power at a reference distance.

22. A cellular wireless communications system, the cellular wireless communications system comprising network nodes and mobile communication units, each network node supporting communications with mobile communication units in cell, a network element of the cellular wireless communications system being operable to:
- derive propagation model parameters, using signals received by mobile communication units from network nodes of the cellular wireless communication system;
- estimate the location of a mobile communication unit within a geographical area of the cellular wireless communications system in accordance with claim 1, wherein the first estimate of the position of a mobile communication unit (905) is derived based on:

(i) at least one received signal power difference measured by the mobile communication unit, for signals received within the geographical area from at least two network nodes; and (ii) at least one contour (C121) indicating locations within the geographical area having constant received signal strength difference for signals received from the at least two network nodes, the at least one contour being derived from the propagation model parameters.

\* \* \* \* \*